UNITED STATES PATENT OFFICE.

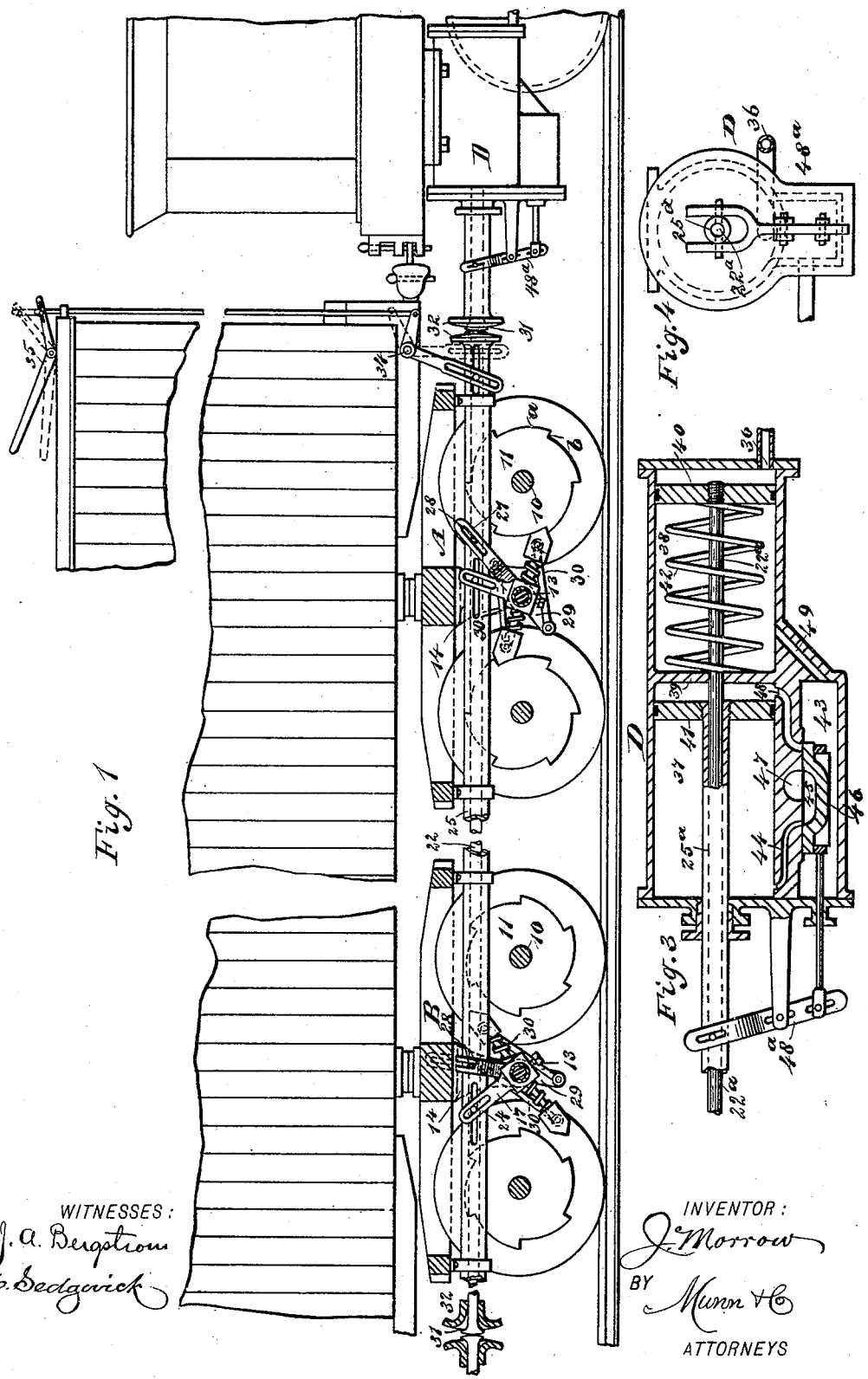

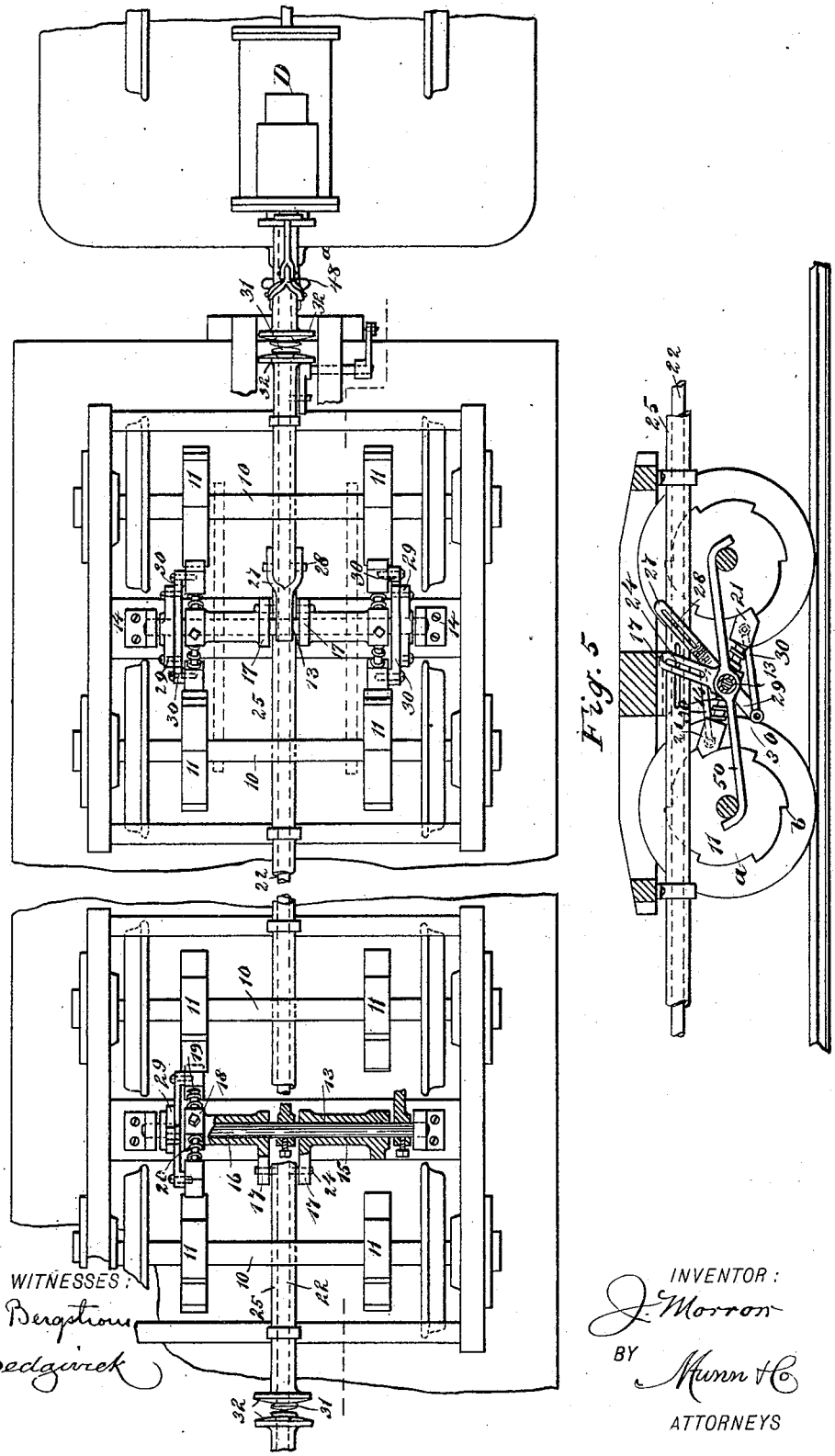

JOHN MORROW, OF NEW YORK, N. Y.

CAR-BRAKE.

SPECIFICATION forming part of Letters Patent No. 471,014, dated March 15, 1892.

Application filed December 5, 1891. Serial No. 414,114. (No model.)

*To all whom it may concern:*

Be it known that I, JOHN MORROW, of New York city, in the county and State of New York, have invented a new and useful Improvement in Car-Brakes, of which the following is a full, clear, and exact description.

My invention relates to a brake for railway-passenger coaches and other forms of cars, and has for its object to provide an auxiliary brake in connection with passenger-coaches, which shall be of simple and economic construction and operated from the engine or from the end of the car to quickly stop a moving train traveling at a high rate of speed.

A further object of the invention is to improve upon the construction shown in the patent granted to me October 26, 1886, No. 351,519, in such a manner as to control the brake from the engine, so that the brake may be expeditiously applied to cause a quick, positive, and close pressure of the brake-shoe on the wheels, and whereby the pressure may be further controlled to force the wheels quickly after the brake is applied to turn a limited direction the reverse of their forward movement, and thereby materially lessen the shock usual in braking and give to the wheels during the act of braking a rolling motion upon the track in a direction the reverse of that in which the train is traveling.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a partial side elevation of a car, illustrating the application of the improved brake, portions of which brake are in section. Fig. 2 is a partial bottom plan view of a car and engine having the brake applied thereto. Fig. 3 is a longitudinal section taken through the cylinder adapted for attachment to the tender of the engine. Fig. 4 is a rear elevation of the cylinder; and Fig. 5 is a central vertical section through one of the brakes, illustrating the brake in its applied position.

Upon the axles 10 of the car near the inner face of each wheel a ratchet-wheel 11 is keyed or otherwise secured, the teeth of which wheels are formed of long curved upper surfaces $a$ and straight faces $b$ at right angles to said curved surfaces. In fastening the ratchet-wheels upon the car-axles they are so placed that in the set provided with the truck A at one end of the car the straight faces $b$ of the teeth of said ratchet-wheels will face in a direction the reverse of the straight faces of the ratchet-wheels located upon the axles of the truck B at the opposite end of the car.

Between the axles of each truck A and B a transverse shaft 13 is held to turn in hangers 14, attached to the car-trucks in any approved manner. Upon the shafts 13 two sleeves 15 and 16 are loosely mounted, the inner ends of which sleeves are located one at each side of the center of the shaft and are provided with projecting arms 17. At the outer end of each sleeve the brake is located, which brake consists of a block 18, provided with arms 19, extending outwardly therefrom in opposite directions in the same plane, the said projecting arms 19 being encircled by springs 20, either spiral or coiled, and the springs having bearing at one end upon the sides of the blocks 18 and against the under side of angular brake-shoes 21, held to slide a limited distance upon the arms 19, as is best shown in Figs. 1 and 5.

The object of the springs 20 encircling the projecting arms of the brakes and the limited play of the brake-shoes upon said arms is to relieve the shoes and arms from the sudden shock which they would otherwise sustain when the simultaneous engagement of the brake-shoes at each end of a brake is made with the teeth of the ratchet-wheels between which the said brake is centered. The brakes held beneath the truck A are inclined at an angle the reverse of the angle maintained by the brakes beneath the truck B. This opposite arrangement of the brakes is required owing to the opposite arrangement of the ratchet-wheels of the two trucks. The brakes are so suspended that they align with the peripheral surfaces of the ratchet-wheels, as is best shown in Fig. 2.

The brakes are manipulated through the medium of a rod 22, having longitudinal movement beneath the car and extending longitudinally at or near the center from end to end. The rod is located above the shafts 13 and a connection is made between the rod and the brakes through the medium of pins 24, which pins pass through the rod and through slots in the arms 17, connected with the body-blocks of the brakes, as is best shown in Figs. 1, 2, and 5.

The rod 22 is contained in a casing 25, which casing has free movement upon the rod, being independent thereof, and to that end the casing is provided with slots through which the pins 24 of the brakes pass to connect with the rod, and the shafts 13 are revolved or rocked through the medium of the casing 25, this being effected by attaching to the shafts between the brakes a lever-arm 27, which arm is bifurcated at its upper ends and spans the casing, being connected therewith by pins 28, secured to the casing and passing through the members of the lever-arm, as is best shown in Figs. 1 and 2.

Each shaft has secured to each outer end a cross-bar 29, as is best shown at the right in Fig. 2, the shafts passing through the central portion of the cross-bars, and said cross-bars are connected by links 30 with the shoes of the brake. The object of this construction is to provide a means whereby when the brakes are applied one link will force the rear shoe outward a sufficient distance to turn the ratchet-wheel with which it is in engagement rearward the distance of one tooth, for instance, thus causing the rear wheels of the forward truck to turn in the same direction, and simultaneously the forward shoe will by its outward pressure force the forward wheels of the forward truck to turn rearward also.

In fact the action of the brake is briefly as follows: The way of the train is checked, first, by the direct and positive application of the brakes, and, secondly, by compelling the brakes to act almost immediately after application to turn the wheels in a direction the reverse of that in which the train was moving, and this reverse rolling action of the wheels upon the track materially lessens the shock incident to braking, and a train may be stopped in much less time than heretofore and without traveling the distance now required. Each rod 22 terminates at its outer end in a head 31, as shown in Fig. 1, and the outer ends of the casing 25 are flared somewhat as a draw-head is, as illustrated at 32 in Fig. 1, it being desirable that the rods 22 of each car of a train when the cars are coupled may come in engagement, so that the movement of one rod will be communicated to the next.

The brakes are preferably operated from the engine; but they may be operated from the top of the car, as shown in Fig. 1, through the medium of an angle-lever 34, pivoted to the side of the car and connected with the rod 22 at one end and with a lever 35, located upon the top of the car at its opposite end; but when the application of the brakes is to be made by the engineer or by a person upon the engine, a cylinder D is placed beneath the engine, into which steam is fed at one end through an inlet-opening 36. This cylinder is divided into two compartments 37 and 38 by means of a central partition 39. In the compartment 38 a piston 40 is held to slide and in the compartment 37 another piston 41 has movement. The piston 40 is firmly secured to one end of a rod $22^a$, which corresponds to the rod 22 beneath the car, and the piston 41 is connected with the inner end of a casing $25^a$, corresponding to the casing 25 beneath the car and encircling the rod $22^a$. Within the compartment 38 a spring 42 is located having a bearing at one end against the partition 39 and at its opposite end against the piston 40.

Beneath the compartment 37 a valve-chamber 43 is located, and an exhaust-port 44 leads from the compartment 37 near its outer end to a steam-space 45 in a sliding valve 46, located in the valve-chamber, the cavity 45 in the valve being in constant communication with an exhaust or outlet port 47, located beneath the compartment 37. An inlet-port 48 leads from the back of the piston 41 down into the valve-chamber, and a steam-supply port 49 connects the valve-chamber with the compartment 38. The valve 46 is operated through the medium of a link connection with a lever $48^a$, fulcrumed upon the outer end of the cylinder D, the outer end of which lever is connected by a pin or otherwise with the rod $22^a$, as is likewise best shown in Fig. 3.

In applying the brakes through the medium of the cylinder when steam is turned on in the compartment 38 the piston 40 is forced outward against the tension of its spring 42, and it acts upon the lever $48^a$ to cause the valve 46 to uncover the exhaust-ports 44 and 47 and the inlet-port 48, leading into the valve-chamber 43 from the compartment 37 of the cylinder, and the moment that the piston 40 passes the port 49 in the compartment 38 the steam will enter the valve-chamber 43 and will pass through the port 44 back of the piston 41 in the chamber 37 and will force said piston downward. Thus it will be seen that the rod $22^a$, being the first to pass outward, will engage with the rod 22 of the car next to the engine and will press said rod rearward a distance sufficient to cause the brakes upon one truck of the car to be applied to the ratchet-wheels on the axle of that car, and the brakes will hold until the piston 41 has moved the casing $25^a$ a sufficient distance to exert pressure upon the casing of the car, and as the casing 25 of the car moves rearward it acts upon the shaft 13, rocking the same, and through the medium of the links and the cross-bars 29 and 30 the forward and rear brake-shoes will be forced outward and the ratchet-wheels on the axles of the forward trucks will be reversed in their movement and the car-wheels be compelled to revolve a limited distance in direction of the rear. By this means a car traveling very rapidly may be stopped without any excess of jar, and consequently without discommoding the occupants of the car.

In order to prevent the axles from bending under the strain brought to bear upon them by the constant engagement of the brakes with the ratchet-wheels, I preferably secure upon the shafts 13 two longitudinal bars 50, as shown in Fig. 5, one near each ratchet-wheel, this position being indicated by dotted lines in Fig. 2. The longitudinal bars are attached to the shafts in any approved manner and their ends are bent in opposite directions, one end passing over an axle of the truck and thence downward and the other under the opposite axle and thence upward. By this means the axles are kept in proper alignment and are effectually prevented from bending under any severe force that may be exerted against them in the possible breaking of a train.

Having thus described my invention, I claim as new and desire to secure by Letters Patent—

1. In a car-brake, the combination, with the car-axles and toothed wheels secured thereon, of brakes located between opposing toothed wheels, provided with sliding shoes, a rocking mechanism connected with the brakes, and a shifting mechanism connected with the brake-shoes, substantially as described.

2. In a car-brake, the combination, with the car-axles, toothed wheels secured to said axles, a cylinder adapted to be located upon an engine or a car, and pistons held to slide in said cylinder, of brakes located between opposing toothed wheels and provided with sliding shoes, a rocking mechanism connected with the body of the brakes, and a shifting mechanism connected with the brake-shoes, said rocking and shifting mechanism having connection also with the pistons, substantially as described.

3. The combination, with the axles of a car-truck, ratchet-wheels secured upon the axles, and brakes engaging with the ratchet-wheels, consisting of a central block, arms projected from the block, and spring-controlled shoes sliding upon the arms, of a rod capable of end movement beneath the car, the said rod being connected with and directly uniting the brakes, a lever having link connections with the shoes of the brakes, and a mechanism for operating the lever, substantially as described, whereby the brake-shoes when applied to the ratchet-wheels may be forced outward without shifting the position of the brake proper, as and for the purpose set forth.

4. The combination, with a car-truck, ratchet-wheels secured to the axles of the truck, brakes held between the opposed ratchet-wheels and capable of a rocking movement, which brakes consist of body-sections, arms projected from the body-sections, and spring-pressed shoes sliding upon the arms, and a rod adapted to be located beneath the car, connected with the brakes and operating the same, of a casing held to slide upon the rod, levers connected with the casing, links connecting the levers with the brake-shoes, a cylinder adapted for the reception of steam and divided into compartments, and independent plungers located in the compartments of the cylinder, one of which is adapted to actuate the rod and the other to actuate the casing around the rod, as and for the purpose specified.

5. The combination, with the axles of a car-truck, ratchet-wheels secured to the axles, a shaft journaled in the truck between the axles, brakes loosely mounted upon the shafts, comprising a body-sleeve, arms projected from the body-sleeve, and spring-controlled brake-shoes adapted for engagement with the opposed ratchet-wheels, the said brake-shoes having a limited movement upon the arms, and a rod having end movement located above the shaft and connected with the sleeves of the brakes and actuating said brakes, of a casing surrounding the rod and capable also of end movement independent of the rod, a cylinder adapted to be located beneath an engine and to receive steam, the said cylinder being divided into two compartments and provided beneath one compartment with a valve-chamber, ports leading from the valve-chamber into the two compartments, a slide-valve located in the valve-chamber, and pistons located in the compartments of the cylinder, one piston being spring-controlled and provided with an attached rod extending through the next compartment and through the ends of the cylinder and adapted for engagement with the rod beneath the car, the other piston having secured thereto a tubular casing surrounding the rod of the opposite piston and capable of a sliding movement thereon, the casing having a lever connection with the valve and being adapted for engagement with the casing beneath the car, substantially as and for the purpose specified.

JOHN MORROW.

Witnesses:
E. M. CLARK,
J. FRED ACKER.